United States Patent
Bronfenbrenner et al.

(10) Patent No.: US 9,005,517 B2
(45) Date of Patent: Apr. 14, 2015

(54) SINGLE-FIRE TWO-STEP SOAK METHOD

(75) Inventors: David J Bronfenbrenner, Painted Post, NY (US); Lisa Larae Hepburn, Corning, NY (US); Sriram Rangarajan Iyer, Painted Post, NY (US); Lev Lvovitch Kuandykov, Saint Petersburg (RU); Dell Joseph St Julien, Watkins Glen, NY (US); Elizabeth Ann White, Corning, NY (US)

(73) Assignee: Corning Incorporated, Corning, NY (US)

( * ) Notice: Subject to any disclaimer, the term of this patent is extended or adjusted under 35 U.S.C. 154(b) by 449 days.

(21) Appl. No.: 13/472,770

(22) Filed: May 16, 2012

(65) Prior Publication Data

US 2013/0307176 A1 Nov. 21, 2013

(51) Int. Cl.
C04B 35/64 (2006.01)
C04B 35/195 (2006.01)
C04B 38/00 (2006.01)

(52) U.S. Cl.
CPC ........... C04B 35/195 (2013.01); *C04B 2235/36* (2013.01); *C04B 2235/6567* (2013.01); *C04B 2235/661* (2013.01); *C04B 2235/76* (2013.01); *C04B 2235/767* (2013.01); *C04B 2235/80* (2013.01); C04B 38/0006 (2013.01); *C04B 2235/5436* (2013.01); *C04B 2235/6562* (2013.01); *C04B 2235/96* (2013.01); *C04B 2235/9607* (2013.01)

(58) Field of Classification Search
CPC .......................... C04B 35/195; C04B 38/0006
USPC ........................................................ 264/631
See application file for complete search history.

(56) References Cited

U.S. PATENT DOCUMENTS

| | | | |
|---|---|---|---|
| 5,332,703 A | 7/1994 | Hickman | |
| 6,221,308 B1 | 4/2001 | Peng | |
| 6,864,198 B2 | 3/2005 | Merkel | |
| 7,485,170 B2 | 2/2009 | Beall et al. | |
| 7,914,728 B2 | 3/2011 | Nakamura | |
| 7,960,009 B2 * | 6/2011 | Backhaus-Ricoult et al. | 428/116 |
| 2003/0165661 A1 | 9/2003 | Noguchi et al. | |
| 2007/0259153 A1 | 11/2007 | Noguchi et al. | |
| 2008/0047243 A1 | 2/2008 | Beall et al. | |
| 2009/0062105 A1 * | 3/2009 | Custer et al. | 501/80 |

FOREIGN PATENT DOCUMENTS

| | | | |
|---|---|---|---|
| EP | 1270531 | 1/2003 | ............. C04B 35/16 |
| EP | 2 108 447 | 10/2009 | |
| EP | 2 183 199 | 3/2011 | |
| WO | WO2009/029276 | 3/2009 | ............. B28B 11/24 |

* cited by examiner

*Primary Examiner* — Erin Snelting
(74) *Attorney, Agent, or Firm* — John L. Haack

(57) ABSTRACT

A method for making a cordierite filter article, including:
firing an extruded green body batch composition according to:
a first temperature ramping from ambient temperature up to a first soaking temperature;
a first soaking at a temperature of at least 1255° C. for at least 2 hours;
a second temperature ramping from the first soak temperature down to a second soak temperature; and
a second soaking at a temperature of at least 1250° C. and at least 5° C. below the first soaking temperature, as defined herein.

17 Claims, 6 Drawing Sheets

[prior art]

[prior art]

900   910

1000   1010

SINGLE-FIRE TWO-STEP SOAK METHOD

The entire disclosure of any publication or patent document mentioned herein is incorporated by reference.

CROSS-REFERENCE TO RELATED APPLICATIONS

This application is related to commonly owned and assigned co-pending international patent application number PCT/US10/58176 filed Nov. 29, 2010, and published May 29, 2012, entitled "PROCESS FOR CONTROL OF CORDIERITE FILTER PROPERTIES," but does not claim priority thereto. The related application mentions a process for preparing a cordierite filter article, including: selecting an extruded green body batch composition and accomplishing a first firing at selected first parameters to provide a first-fired article having first pore properties; and accomplishing a second firing at a selected second parameter to provide a second-fired article having thermo-mechanical properties and having second pore properties. Also disclosed are cordierite filter articles, including a matrix of walls, prepared by the disclosed co-pending process.

FIELD

The disclosure relates generally to manufacturing processes for making cordierite filter articles.

BACKGROUND

Various methods are known for making engine exhaust emission reducing articles, including catalyst supports, or substrates, and filters.

SUMMARY

The disclosure provides a two-step soak fire process for making cordierite filter articles. The filter articles can be used, for example, in engine exhaust systems.

BRIEF DESCRIPTION OF THE FIGURES

In embodiments of the disclosure.

DETAILED DESCRIPTION

Figure 1:
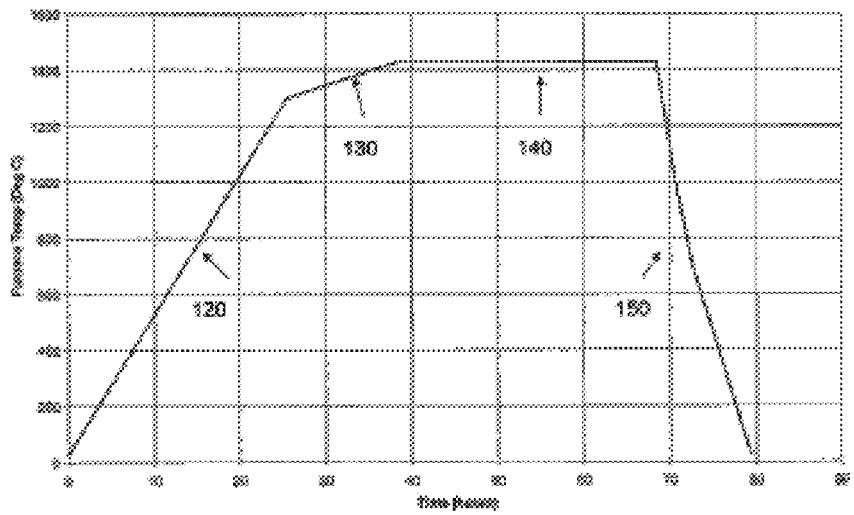
FIG. 1 shows a comparative prior art firing cycle from U.S. Pat. No. 7,485,170.

Various embodiments of the disclosure will be described in detail with reference to drawings, if any. Reference to various embodiments does not limit the scope of the invention, which is limited only by the scope of the claims. Additionally, any examples set forth in this specification are not limiting and merely set forth some of the many possible embodiments of the claimed invention.

In embodiments, the disclosed articles, and the method of making and use of the articles provide one or more advantageous features or aspects including, for example, as discussed below. Features or aspects recited in any of the claims are generally applicable to all facets of the invention. Any recited single or multiple feature or aspect in any one claim can be combined or permuted with any other recited feature or aspect in any other claim or claims.

Definitions

"Porosity," and like terms generally refer to the total void space in a honeycomb material that can be attributed to the presence of pores and excludes the void space in a honeycomb material attributable to the presence of macroscopic channels or vias of the honeycomb, or the ratio of the pore volume to the total volume of a pulverized solid material, and may be expressed as percent porosity (% P). Porosity and its pore structure characterization, and like aspects of the ceramic bodies, are mentioned in commonly owned and assigned U.S. Pat. No. 6,864,198. Parameters such as d10, d50 and d90 relate to the pore size distribution. The quantity d50 is the median pore size (MPS) based upon pore volume, and is measured in micrometers; thus, d50 is the pore diameter at which 50% of the open porosity of the ceramic has been intruded by mercury as measured by mercury porosimetry. The quantity d90 is the pore diameter at which 90% of the pore volume is comprised of pores whose diameters are smaller than the value of d90; thus, d90 is equal to the pore diameter at which 10% by volume of the open porosity of the ceramic has been intruded by mercury. The quantity d10 is the pore diameter at which 10% of the pore volume is comprised of pores whose diameters are smaller than the value of d10; thus, d10 is equal to the pore diameter at which 90% by volume of the open porosity of the ceramic has been intruded by mercury. The values of d10 and d90 are also in units of micrometers. The quantity (d50−d10/d50) describes the width of the distribution of pore sizes finer than the median pore size, d50.

"Total intrusion volume," "total porosity," "TIV," and like terms or representations refer to pore volume measured by mercury intrusion porosimetry.

"Total pore volume," "TPV," "percent fines," "% fines," and like terms or representations refer to total pore volume less than 10 microns.

"Percent fine pore distribution" and like terms refer to the fractional amount, expressed as a percentage, of pores finer than specified pore diameter or dimension. Thus, for example, pores finer than 10 microns can be calculated by subtracting the mercury intruded volume at a pressure intended to fill all pores greater than or equal to 10 microns from the total intrusion volume and then dividing that difference by the total intrusion volume.

"Super additive," "super addition," and like terms generally refer to adding additional ingredients or materials to a batch composition or like formulation in excess of, or in addition to, a 100 wt % base inorganics formulation. A base formulation totaling 100 wt % can be, for example, a single inorganic material or combination of inorganic materials, and the super additives can be a mixture of pore formers, with or without other super additives, and can be present or added to the batch in, for example, from about 5 to about 300 wt % in addition to the base formulation 100 wt %.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, and like values, and ranges thereof, employed in describing the embodiments of the disclosure, refers to variation in the numerical quantity that can occur, for example: through typical measuring and handling procedures used for making compositions, concentrates, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture. The appended claims include equivalents of these "about" quantities.

"Consisting essentially of" in embodiments refers, for example, to a filter article having, for example, predetermined physical properties such as pore structure, to a method of making a filter article and precursors thereto, devices incorporating the filter article, and can include the components or steps listed in the claim, plus other components or steps that do not materially affect the basic and novel properties of the compositions, articles, apparatus, or methods of making and use of the disclosure, such as particular reactants, particular additives or ingredients, a particular agents, a particular surface modifier or condition, or like structure, material, or process variable selected. Items that may materially affect the basic properties of the components or steps of the disclosure or that may impart undesirable characteristics to the present disclosure include, for example, an article having significantly different porosity, and methods of making having firing specifications that are beyond the values, including intermediate values and ranges, defined and specified herein.

The indefinite article "a" or "an" and its corresponding definite article "the" as used herein means at least one, or one or more, unless specified otherwise.

Abbreviations, which are well known to one of ordinary skill in the art, may be used (e.g., "h" or "hr" for hour or hours, "g" or "gm" for gram(s), "mL" for milliliters, and "rt" for room temperature, "nm" for nanometers, and like abbreviations).

Specific and preferred values disclosed for components, ingredients, additives, and like aspects, and ranges thereof, are for illustration only; they do not exclude other defined values or other values within defined ranges. The compositions, apparatus, and methods of the disclosure can include any value or any combination of the values, specific values, more specific values, and preferred values, including intermediate values and ranges described herein.

Cordierite honeycomb structures are used in applications such as diesel particulate filters. One such commercial product is Heavy Duty Advanced Cordierite (HDAC). The manufacturing process for Heavy Duty Advanced Cordierite (HDAC) filter products can involve a single step firing process (hereafter referred as "single firing") where the article is heated to a soak temperature, soaked (i.e., held) for a period of time and cooled to room temperature, or a two step firing process (hereafter referred as "double firing") may be employed where the product is heated again to a second soak temperature, soaked for a period of time and again cooled to room temperature. The first firing step may be followed by plugging, skinning, or both, and subsequently the second firing step sets plugs, skin, or both. This second firing is an additional process step having associated costs, and capital and asset utilization. The second firing process can be eliminated if plug, skin, or both materials are applied to the unfired green article, or if plug, skin, or both materials are used that do not require a high temperature thermal processing (hereafter referred to as "cold set" skin or plugs). However, a single firing method is desirable that can provide desired filter properties, such as pore size distribution, phase assemblage, and coefficient of thermal expansion (CTE).

For cordierite filter compositions, such as disclosed in commonly owned and assigned U.S. Pat. No. 7,485,170, a second fire process was mentioned to produce a shift in physical properties and performance. Thus, a change in the overall firing process can advantageously produce properties after a single firing that are substantially the same as, or show an improvement over, those obtained after a second firing, and permit cost savings through use of cold set skin or the elimination of the second firing step.

A main aspect of the present disclosure is to use a specific time and temperature firing cycle, having two different soak temperatures, which provide desired physical properties in a single firing process.

Properties of the cordierite honeycomb used in diesel particulate filters can be set by, for example, selection of the raw materials, the forming process, and the firing method. Previously disclosed firing methods make use of ramps up to the top soak temperature, top soak temperature, top soak time, and the cooling ramp rates from the top soak to room temperature to control microstructure and properties in cordierite bodies. Typical soak temperatures are from, for example, 1350° C. to 1470° C., and more commonly from 1410° C. to 1440° C. (and as disclosed in the abovementioned U.S. Pat. No. 7,485,170). The maximum temperature is typically maintained for from 3 to 10 hours (see e.g., US20070259153) or from 10 to 35 hours (U.S. Pat. No. 7,485,170). Peak temperatures greater than about 1440° C. are typically not used because the cordierite produced may be molten, while temperatures lower than 1410° C. are typically not used because the sintering may be insufficient (see e.g., U.S. Pat. No. 7,914,728).

For cordierite diesel filters, times greater than about 6 hours have been shown to be advantageous, see e.g., US 20030165661, when combined with cooling rates less than 50° C./hr from the maximum temperature to 1250° C. or 1300° C., where the resulting article has a total cordierite content of greater than 85% by weight, and the constituent phase concentration of indialite less than 30 wt %, and the cordierite greater than 60 wt %. US 20030165661 also disclosed that cooling to only 1350° C. at less than 100° C./hr is ineffective and results in less than 60% total cordierite crystal phase and a decreased amount of crystalline material. A soak of only 4 or 6 hours, even with a cooling rate as low as 25° C./hr, results in a body with less than 70 wt % total cordierite and indialite at about 23.5 wt % or more.

Figure 4:
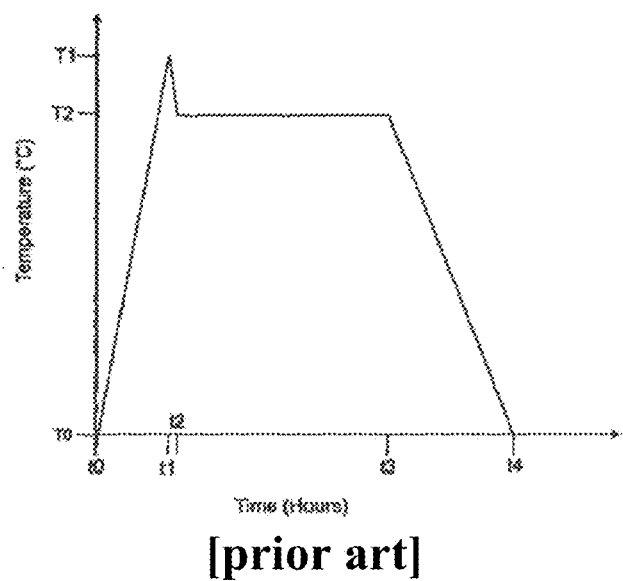
FIG. 4 shows a comparative prior art firing cycle from EP 2183199.

FIG. 4 shows a comparative prior art firing cycle from EP 2183199. EP2183199 mentions a method of firing where an initial "peak" is followed by a "soak" and has been used to generate a fine pore size distribution in the sintered article. The initial peak temperature can be up to 1470° C. and this temperature is greater than the soak temperature. In this method, cordierite forms primarily during a hold at the soak temperature which lies between two limits, a lower soak limit and a higher soak limit, which are typically 1300° C. and 5° C. below the peak temperature, respectively. The time at the peak temperature in this method is held to less than 2 hours while the time at soak is typically greater than 2 hours, and preferably between 4 and 20 hours.

Additional calcining steps can be added prior to firing to remove organics or to pre-condition the inorganics. Typical pre-firing calcination temperatures are from 200° C. to 1000° C. for from 10 to 100 hours, see e.g., US 20070259153.

Preferred ranges have been disclosed for firing ramp rates at temperatures between, for example, 800° C. and the 1000° C., see e.g., U.S. Pat. No. 7,914,728, or from 1300° C., and the maximum soak temperature, see e.g., U.S. Pat. No. 7,485,170. These rates may also be chosen depending upon, for example, the target pore size, batch kaolin content, and other batch input properties, see e.g., US 20080047243. Aspects of the porosity previously described include the total pore volume (TPV), the percent of TPV less than or greater than a specific pore diameter, such as % TPV less than 10 microns referred to herein as % fines, and a specific ratio of pore distribution percentiles referred to as d-factor (df) where df=(d50–d10)/d50.

Double firing has been disclosed as a means setting plugs or firing on coatings, see e.g., EP 21084472. Firing temperature and firing time for coatings can be, for example, 1430° C. and 3 hours.

The attributes of the microstructure of interest for cordierite diesel particulate filters can include, for example, cordierite crystallite size, crystalline domain size, crystal orientation, the presence, concentration, and distribution of non-cordierite phases (referred to herein as secondary phases), concentration and distribution of amorphous phases, pore size distribution, total porosity, connectivity of the porosity, the density and length of micro-cracks, and the crystal structure of cordierite present (orthorhombic abbreviated as "O", and hexagonal cordierite also known as indialite abbreviated as "H"). The total cordierite content is the sum of the orthorhombic and hexagonal phases (O and H).

CTE reduction is a result of the increased O/H ratio and decreased secondary phases. Fine porosity is formed during the first soak and evolves with further time-temperature treatment. Although not limited by theory, the mechanism of fine porosity formation seems to be due to the void left by migration or consumption of glass to form cordierite. It is further hypothesized that the typical second fire is able to sinter out these pores. Note that simply holding for additional time does not cause the pores to sinter away in a reasonable time.

The measured properties of interest include thermo-mechanical: modulus of rupture (MOR), elastic modulus (Emod), coefficient of thermal expansion (CTE), X-ray Rietveld analysis of phases present, and hydrodynamic: pore distribution as measured by Hg intrusion porosimetry, including specifically the median pore size referred to herein as pore d50, the percentage of the total porosity less than 10 microns (TPV or % fines), and the total Hg intrusion volume in units of mL/g (TIV).

Figure 2:
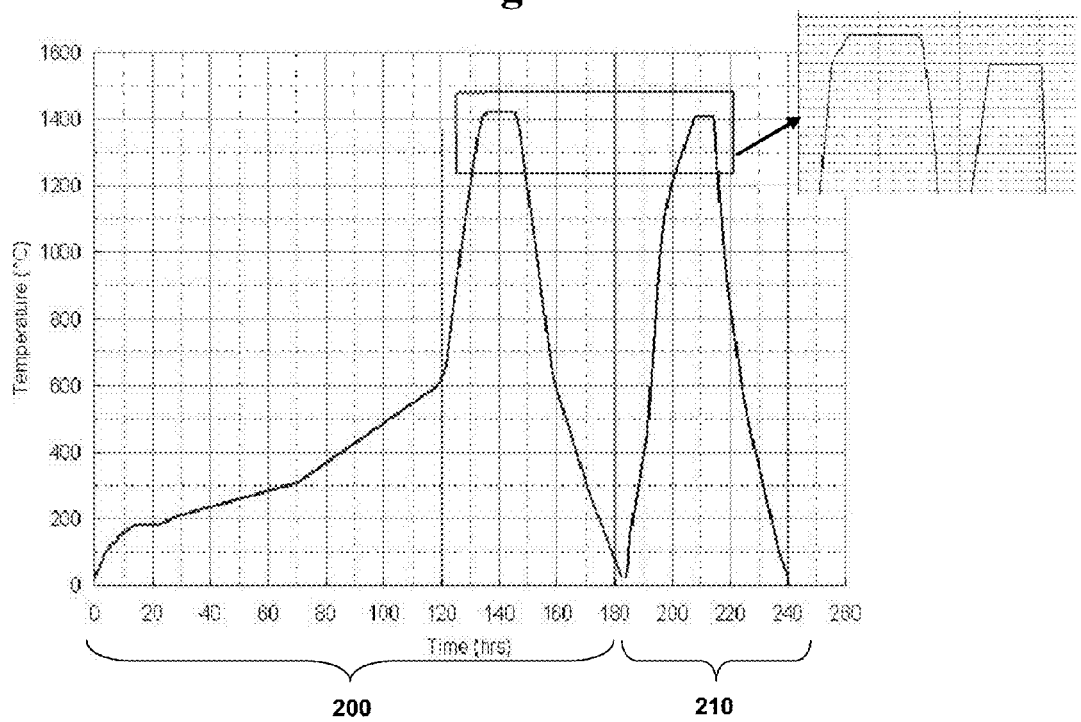
FIG. 2 shows a comparative prior art first and second fire cycle from co-pending PCT/US2010/58176.

In abovementioned commonly owned PCT/US2010/58176, (WO2012074504 A1) properties can be adjusted through the employment of two complete firing cycles, as shown in FIG. 2 where the first firing cycle (200) converts a majority of the raw materials, typically greater than 75%, to cordierite including nucleation and growth of the domain structure and establishment of the cordierite crystal orientation. The second firing cycle (210) typically further develops the microstructure, provides for additional grain growth, reduces the concentration of amorphous phases and secondary phases, further adjusts the pore distribution (e.g., may reduce fine porosity and grow large pores), enhances the conversion of hexagonal to orthorhombic cordierite, and increases the micro-crack density on cooling to impact the measured properties.

In embodiments, the disclosure provides a method for producing a cordierite filter article, comprising:

firing an extruded green body batch composition according to:

a first temperature ramping from ambient temperature up to a first soaking temperature;

a first soaking at a temperature of at least 1255° C. for at least 2 hours;

a second temperature ramping from the first soak temperature down to a second soak temperature; and a second soaking at a temperature of at least 1250° C. and at least 5° C. below the first soaking temperature.

In embodiments, the method can optionally further comprise a third temperature ramping to cool the body.

In embodiments, the first and the second soaking times can each be accomplished, for example, over about 2 to 12 hrs, and the resulting fired body can have an amorphous phase present in at least 3 wt %, and has % fines present in an amount of at least 5% after the second soaking if the third temperature ramping cools the body to ambient temperature.

In embodiments, the first soaking temperature can be, for example, from 1400 to 1435° C., and the second soaking temperature is from 1290 to 1410° C.

In embodiments, the second soaking temperature can be, for example, 10° C. below first soaking temperature of at least 1300° C. The first soaking can be, for example, accomplished over about 2 to about 30 hours, 2 to 20 hours, 2 to 12 hours, and 2 to 10 hours, including intermediate values and ranges; and the second soaking can be, for example, accomplished over about 2 to about 30 hours, 2 to 25 hours, 2 to 15 hours, and 2 to 12 hours, including intermediate values and ranges.

In embodiments, the second temperature ramping from the first soak temperature down to a second soak temperature can be accomplished, for example, at about 25° C./hr to about 150° C./hr, for example, from about 50° C./hr to about 150° C./hr, from about 66° C./hr to about 125° C./hr, from about 80° C./hr to about 120° C./hr, from about 80° C./hr to about 110° C./hr, and from about 85° C./hr to about 100° C./hr, including intermediate values and ranges.

In embodiments, the third temperature ramping from the second soaking temperature to ambient temperature can be accomplished, for example, at a rate of about 50° C./hr to 250° C./hr, including intermediate values and ranges.

In embodiments, the first temperature ramping can be, for example, from about 25° C./hr to about 100° C./hr, and preferably between 50° C./hr and 75° C./hr.

In embodiments, the amorphous phase can be present, for example, in an amount of from 2 to 50 wt %, from 2 to 40 wt %, from 3 to 35 wt %, from 3 to 25 wt %, from 5 to 25 wt %, from 10 to 25 wt %, and from 10 to 20 wt %, based on the total weight of the resulting fired body, including intermediate values and ranges.

In embodiments, the % fines can be present, for example, in an amount of from 5% to 15%, 5% to 10%, and 5% to 8%, including intermediate values and ranges, after the second soaking.

In embodiments, the wt % glass before the first soak can be, for example, from 10 to 50%, and preferably about 25% to 50%, including intermediate values and ranges, and the first soak time can have less than 95% complete conversion to cordierite, and preferably less than 90% but greater than 85% complete conversion to cordierite. The "% complete" in this context refers to the extent of reaction or conversion of the batch materials into cordierite, that is, the cordierite being present at about 95% by weight in the whole fired body, as determined by, for example, XRD.

In embodiments, the resulting cordierite filter article can have, for example, a CTE of from about 1 to about 8, an orthorhombic to hexagonal (O/H) cordierite phase ratio of from about 7 to about 12, and a % fines of from about 5 to about 15 wt %. The CTE can be, for example, less than 8, less than 6, less than 4, the O/H ratio greater than 8, greater than 10, and the % fines less than 15 wt %.

In embodiments, the resulting cordierite filter article can have a CTE, for example, of from about 3 to about 8, the wt % amorphous phase can be, for example, from about 5 to about 10 wt %, the MOR can be, for example, from 2.28 to 2.93 MPa (about 330 to about 425 psi) for a 200/12 product configuration, and the Emod can be, for example, 4,137 to 6,895 MPa (about 0.6 to about 1 Msi) for a 200/12 product configuration. In embodiments, the resulting cordierite filter article can have a CTE less than $8\times10^{-7}$(°$C^{-1}$); a % fines less than <10%, less than 8 wt %, and less than 7%; a % amorphous phase greater than 5%, and greater than 7%; a MOR greater than 2.28 MPa (330 psi) for a 200/12 product configuration, and greater than 2.4 MPa (360 psi); and an Emod greater than 4,137 MPa (0.6 Msi) for a 200/12 product configuration.

In embodiments, the disclosure provides a method of making a ceramic honeycomb article, comprising:

forming a honeycomb green body from a plasticized cordierite precursor batch composition containing: inorganic batch components selected from a magnesium oxide source; an alumina-forming source; a silica-forming source, or a combination thereof; a pore former; a liquid vehicle; and a binder; and accomplishing a firing according to aforementioned single fire two-step soak process of the honeycomb green body effective to convert the honeycomb green body into a ceramic honeycomb article containing cordierite.

In embodiments, the particle size of one or more of the inorganic batch components can be, for example, from about 10 to about 50 microns, such as greater than 10 microns, greater than 15 microns, and greater than 20 microns.

In embodiments, the silica-forming source can have, for example, a silica particle size distribution (PSD) d50 of about 20 microns or greater than 20 microns, and the first soaking time can be, for example, from about 5 to 10 hours. The PSD can be from 15 to 30 microns, and the first soak time is less than or equal to 10 hrs, less than or equal to 8 hrs, less than or equal to 6 hrs, including intermediate values and ranges.

In embodiments, the resulting cordierite filter article can have, for example, a CTE of from about 1 to about 8, such as less than 8, less than 6, and less than 4, an orthorhombic to hexagonal (O/H) cordierite phase ratio of from about 7 to about 12, such as greater than 8, such as 9 to 10, and the % fines can be, for example, from about 5 to about 15 wt %, such as less than 15 wt %.

In embodiments, the pore former(s) can have a median particle diameter of from about 5 to about 60 microns, and from about 30 to greater than 40 microns.

In embodiments, the first soak can be, for example, from 2 to 6 hours at a temperature of greater than 1427° C., and the second soak can be, for example, from 2 to 6 hours at a temperature of less than 1350° C.

In embodiments, the MOR can be, for example, greater than 350 psi, and the CTE can be less than about 8, and further less than about 3. In embodiments, the resulting cordierite filter article can have thin honeycomb walls having a thickness, for example, of 6 to 10 mils, and high strength having a MOR greater than 200 psi. In embodiments, the resulting cordierite filter article can have, for example, a die cell density of 200 cpsi, a wall thickness from 6 to 10 mils (0.006 to 0.010 in), and a MOR of greater than 190 psi. In embodiments, the resulting cordierite filter article can have, for example, a die cell density of 300 cpsi, a wall thickness from 6 to 10 mils, and a MOR of greater than 230 psi.

In embodiments, the disclosure provides a method having a relatively short first soak of about 2 to 6 hours, and relatively low temperature second soak of, for example, less than about 1350° C., and more preferably less than about 1325° C.

In embodiments, the disclosure provides a method having a first soak temperature of greater than 1427° C., and more preferably greater than 1430° C., for about 6 to 15 hours, and preferably for about 8 to 12 hours; and a second soak temperature of greater than 1350° C. to less than 10° of the first soak temperature for about 6 to 20 hours, and preferably about 8 to 12 hours.

In embodiments, the disclosure provides a method for producing cordierite filter articles having a TPV less than 10 microns of less than 10%, and preferably less than 8%.

In embodiments, the disclosure provides a method having a relatively short first soak of about 2 to 6 hours at a temperature of greater than 1420° C., of greater than 1425° C., and preferably greater than 1428° C., and a second soak having a relatively low temperature, for example, less than about 1350° C., and more preferably less than about 1325° C.

Figure 3:
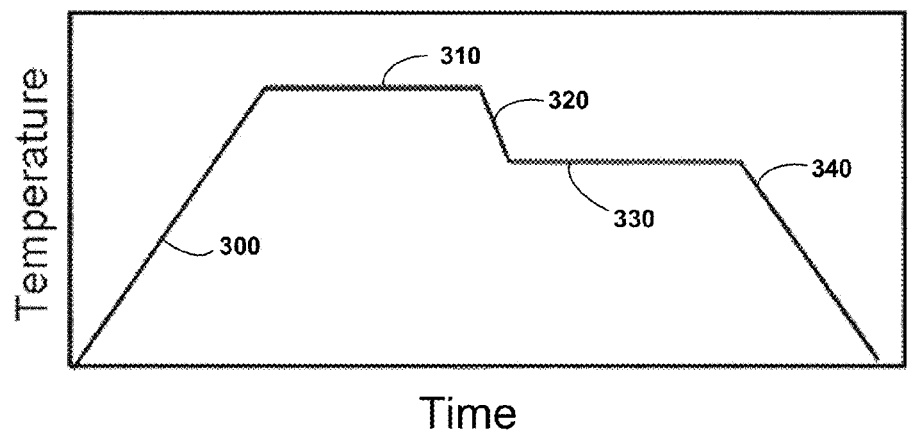
FIG. 3 illustrates an example of an inventive two-step fire process.

In embodiments, the disclosure provides a method of firing ("single fire two-step soak" or "two-step soak firing") that provides superior control for achieving desired physical properties in the fired ceramic article. The disclosed two-step soak firing method is characterized by two soak temperatures where the body is subjected to a first soak temperature and is followed by a second soak temperature prior to cooling to room temperature. FIG. 3 illustrates an example of an inventive single-fire two-step soak process, including a first soak (310), a second soak (330), and ramp conditions into and out of the two soaks including: a first increasing ramp (300), a second decreasing ramp (320), and third decreasing ramp (340). Prior methods of firing have used a single soak temperature, and ramp rates leading to soak and cooling from soak, to control physical properties. The presently disclosed process is differentiated from previously disclosed methods that make use of a single firing cycle or methods that use a second complete firing cycle to obtain the desired physical properties (e.g., such as low CTE and % fines). Elimination of a second firing cycle can provide a significant cost reduction in equipment, labor, and energy, and enable shorter top soak times that can result in additional energy savings and reduced capital costs for tunnel kilns. One benefit is the possible reduction in the time spent at the peak soak temperature, which lowers emission of NOx and F, thereby reducing the cost of emission controls such as scrubbing. The secondary soak effectively converts residual amorphous phases to cordierite and use of a specific secondary soak temperature enables targeting of a specific equilibrium phase assemblage including crystalline cordierite content and O/H ratio. For example, the secondary soak is effective in stabilizing the microstructure yielding a high O/H and low amorphous content.

In advanced cordierite (AC) products made by Corning, Inc., a high ramp rate, e.g., 57 to 66° C./hr, from 1000° C. to soak temperature can be used. The high ramp rate for this AC composition allows for the formation of a large median pore size (d50) of about 19 microns, and a fine pore size distribution (d-factor) of about 0.43. Note that high d50 and low d-factor is a significant product attribute that gives the product a pressure drop advantage. However, these ramp rates also produce high CTE which is not desirable for thermo-mechanical aspects of product performance. A standard second firing (double fire process) reduces the CTE (after first fire) and lowers % fines while stabilizing MOR and Emod values.

In contrast, the present disclosure provides a single fire process having a two-step soak or two-stage soak that can achieve the same or similar results as a double firing process. The first step develops a preferred pore structure, as disclosed in commonly owned and assigned U.S. Pat. No. 7,485,170, while the second firing step allows the CTE to be tailored to desired values without negatively impacting the pore size distribution. Stated alternatively in mechanistic terms, the first step nucleates the ideal pore microstructure and phase assemblage, while the second step grows, stabilizes, and refines the microstructure.

Technical and commercial advantages of the present disclosure can include, for example:

achieving desired physical properties in heavy duty advanced cordierite (HDAC) materials in a single fire process, which mimics results and properties attainable from a double fire process as disclosed in the above-mentioned co-pending international patent application number PCT/US10/58176;

enabling implementation of cold set plugs and considerable consequent cost savings, for example: avoiding the cost and operating expense of a second kiln; and avoiding the variable costs by eliminating process steps, e.g., kiln loading unloading, handling, kiln natural gas, personnel, etc.;

providing independent process controls for adjusting porosity (d50 and TIV) and CTE, i.e., use the ramp rates from 1000° C. to soak temperature and a step one soak time to deliver pore size and pore distribution, and use of a second step soak to deliver CTE and microstructure stability;

providing routes to decreased fine porosity without compromising other microstructure features such as % amorphous and residual phases;

providing routes to increased MOR for a given composition compared to a standard one-step single-fire process;

enabling lower soak temperatures compared to alternative methods for single fire, which alternative methods typically need to achieve very high soak temperatures (e.g., 1431° C.), which is advantageous from a process perspective since high soak temperatures are associated with increased process variability, decreased property control, and increased NOx emissions;

avoiding controlled cooling, which is also common in alternative methods; and providing capability for stabilizing the ceramic microstructure, e.g., high orthorhombic to hexagonal ratio (O/H), lower amorphous content, and high conversion of batch materials to cordierite.

By incorporating a second distinct soak within a single firing, the current method is differentiated from those previously disclosed methods that use only ramp rates, leading to soak and cooling from soak, and soak time and temperature to produce the desired physical properties. Use of an intermediate hold ensures uniformity of soak time and temperature and allows for the separate control of fine porosity and phase assemblage, and the long controlled cooling from the maximum temperature that has been previously disclosed are not required for achieving desired properties. The disclosure addresses some of the limitations of the slow cooling approach in that a secondary hold at 1350° C. is sufficient to yield high cordierite contents above 85% with secondary holds from 1300° C. to 1405° C. or more, whereas slow cooling to 1350° C. has been disclosed US Patent Application No. 20030165661, to be insufficient to yield such high cordierite contents.

The method of the presently disclosed process uses the 2-step firing process to achieve the same or similar results of a single firing step, i.e., a first step (primary soak) followed by a brief ramp to a second firing step (secondary soak), and followed by ramp down cooling to room temperature. The primary soak develops a substantially crystalline cordierite structure and establishes the backbone for the desired pore structure. The secondary soak further develops the crystalline cordierite phases, allows the CTE to be tailored to desired values, and fully develops the pore structure without negatively impacting the pore size distribution (e.g., minimizing the % fines). The first step nucleates the ideal pore microstructure and phase assemblage while the second step grows, stabilizes, and refines the microstructure. The method provides a substantially independent method of achieving the desired thermo-mechanical and hydrodynamic properties. In embodiments, a primary soak of sufficiently short duration may be combined with a secondary soak to yield a lower % fines as compared to a single temperature soak of the same duration.

The ramp up to the primary soak temperature, and the primary soak time and temperature, establish the cordierite nucleation, domain structure, and cordierite crystal orientation. However the final micro-structure and phase assemblage is further refined by the secondary soak at a temperature substantially lower than the primary soak temperature, preferably 5° to 150° degrees lower, and more preferably 20° to 100° degrees lower, most preferably 30° to 80° degrees lower, including intermediate values and ranges. Alternatively, the primary hold may be in a range of from 1350° to 1450° C. while the preferred secondary hold may be of from 1250° to 1425° C., more preferably in the range 1300° to 1410° C., and even more preferably of from 1350° and 1410° C. Secondary hold times can be, for example, from 1 to 20 hours, more preferably from 2 to 15 hours, and from 4 to 10 hours including intermediate values and ranges.

The method can be applied to improve primarily the thermo-mechanic properties (such as CTE) in situations where a single fire process is deemed insufficient or the method can additionally provide improvements to both the hydrodynamic related properties, such as pore distribution, and the thermo-mechanic properties.

Figure 5:
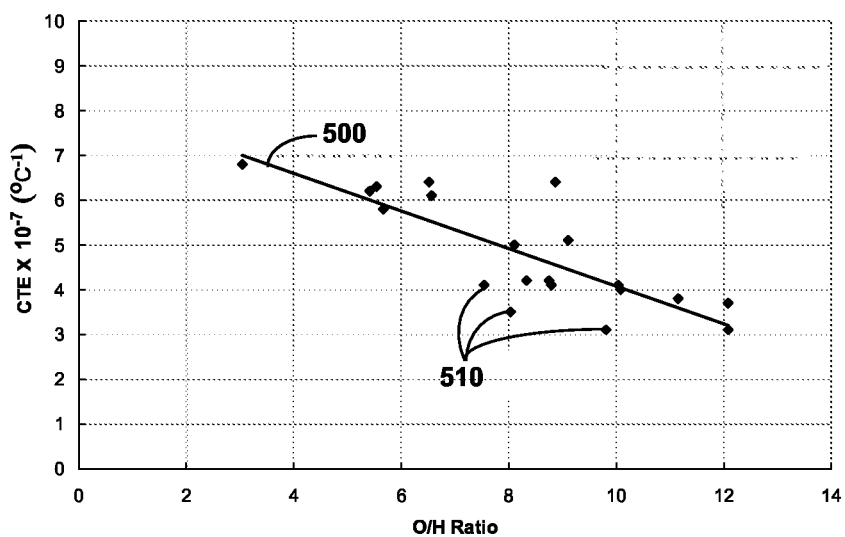
FIG. 5 shows a graph of CTE×107 (° C.−1) as a function of O/H Ratio for linear fitted CTE (500) and inventive CTE samples (510).

The relationship between cordierite phase assemblage (i.e., the ratio of O phase content to H phase content) and CTE is shown in FIG. 5. FIG. 5 shows a graph of CTE×$10^{-7}$ (° C.-1) as a function of O/H Ratio for linear fitted CTE (500) (y=−0.4206x+8.279; R2=0.6417) and inventive CTE samples (510). Generally, a higher O/H ratio correlates with a lower CTE. In embodiments, the secondary soak can be used to lower CTE and improve the thermo-mechanical properties. The green body can be heated to a primary soak temperature. A primary soak of short duration has been shown to produce a cordierite content between about 80% and 98% of the total material present, preferably between about 85 and 95%, and even more preferably greater than or equal to about 85%. In embodiments, the cordierite content can be greater than or equal to about 90% if cooled to room temperature at a rate of about 70° to about 100° C./hr. These conditions are listed in Table 1 where interpolated data is presented for primary soak times between 6 and 12 hours.

In embodiments, the articles after primary soak exhibit a percent of pores less than 10 microns (% fines) less than about 15%, and more preferably less than about 10%. The fired bodies so produced contain total minor phases (non-cordierite amorphous and crystalline phases) amounting less than about 15% of the total material present, preferably less than 12%, and in preferred embodiments less than about 10% of the total material. Application of the method is shown to lower CTE by about $3 \times 10-7/°$ C. in comparison with a single step firing with the same top soak temperature and soak time. The disclosed 2-step fired body may exhibit a CTE of less than $8 \times 10-7/°$ C., more preferably less than $6 \times 10-7/°$ C., or even less than $4 \times 10-7/°$ C.

In embodiments, the disclosed method can be applied to improve both the thermo-mechanical properties, such as CTE, and hydrodynamic related properties, such as pore distribution. The green body can be heated to a primary soak temperature and the primary soak can be of a relatively short duration, and was demonstrated to produce a cordierite content between about 50% and 90% of the total material present, more preferably between about 80% and 87%, and most preferably between about 82% and 85% if cooled to room temperature at a rate of 70° to 100° C./hr.

In a preferred embodiment, the articles after primary soak exhibit percent of pores less than 10 microns between (% fines) about 0 and 10%, more preferably between 0 and 9%, even more preferably between 0 and 7%, including intermediate values and ranges. In one preferred embodiment, the % fines after only a primary soak is, for example, about 1% to about 5%, about 0.5% to about 5%, including intermediate values and ranges. The fired bodies so produced contain total minor phases (non-cordierite amorphous and crystalline phases) amounting to at least 10% of the total material present, preferably at least 12%, and in one preferred embodiment at least 15% of the total of which at least 7% is amorphous, preferably at least 9%, and in one embodiment at least 10% or more but less than 20% amorphous phases are present after the primary soak. Application of the method can lower amorphous phase content by 5% or more, to increase O/H ratio as compared to single step firings with about the same soak time and temperature, CTE by $3 \times 10-7/°$ C. compared to a single step firing with the same top soak temperature and soak time. The 2-step fired body can exhibit a CTE of less than $8 \times 10-7/°$ C., more preferably less than $6 \times 10-7/°$ C., or even less than $4 \times 10-7/°$ C. The 2-step fired body can exhibit % fines of less than 13%, preferably less than 11%, and most preferably less than 9%. The short soak times and high content of amorphous phase after the primary soak may lower % fines by 3% or more compared to 2-step firings that employ longer primary holds. The total cordierite content after second soak can be about 90% or higher, while cordierite contents above 89% are preferred, contents of greater than 89% in combination with a CTE of less than $6 \times 10-7/°$ C., and % fines of less than 10% is particularly preferred.

In embodiments, the disclosure provides a method to decrease fine porosity without compromising other microstructure features, such as the total minor phases and % amorphous phases. Both lower primary soak times and lower soak temperatures can be used to achieve the desired phase assemblage after the primary soak. Lower primary soak temperatures are advantaged because higher soak temperatures can have higher variability for both two-step and double-firing processes.

In embodiments, the disclosed method can be applied to increase thermo-mechanical properties, such as elastic modulus (Emod) and modulus of rupture (MOR), and hydrodynamic properties especially % fines without compromising sufficiently low CTE. The green body can be heated to an appropriate primary soak temperature and soak time, and subsequently quenching to a lower secondary soak of about 1250° to about 1350° C., and more preferably of about 1275° to about 1325° C. to obtain a final composition with 5% to 15% amorphous content in the final composition, and more preferably between 7% and 12% amorphous content. This can be advantageous for product configurations requiring thin wall (e.g., 6 to 9 mil) where strength decrease is sometimes prohibitive.

The method is especially advantageous for batches having coarse precursor materials with median particle size greater than 10 microns, and specifically from about 15 to 50 microns. The method can be further modified for batches having median particle size values of less than 20 microns, or even less than 10 microns.

EXAMPLES

The following examples serve to more fully describe the manner of using the above-described disclosure, and to further set forth best modes contemplated for carrying out various aspects of the disclosure. These examples do not limit the scope of this disclosure, but rather are presented for illustrative purposes. The working examples further describe how to prepare the porous ceramic filter articles of the disclosure.

Preparation of a green body generally. A green body can be prepared, for example, according to U.S. Pat. Nos. 5,332,703, entitled "Batch Compositions for Cordierite Ceramics," and 6,221,308, entitled "Method of Making Fired Bodies," both assigned to Corning, Inc., and as modified according to the present disclosure.

Comparative Example 1

Samples were prepared from a batch consisting of 40.6% by weight talc with a median particle size of around 28 microns, 14.4% silica with a median particle size of about 24 microns, 18.6% Al(OH)3 with a median particle size of 12 microns, 14.7% Al2O3 with a median particle size of around 7 microns, and 11.7% kaolin with a median particle size of 5 microns. The batch was extruded and fired using a single step cycle that utilized a 66° C./hr ramp from 1200° to soak, soak times and temperatures as given, a 70°-100° C./hr ramp down from soak to ambient temperature.

Figure 6:
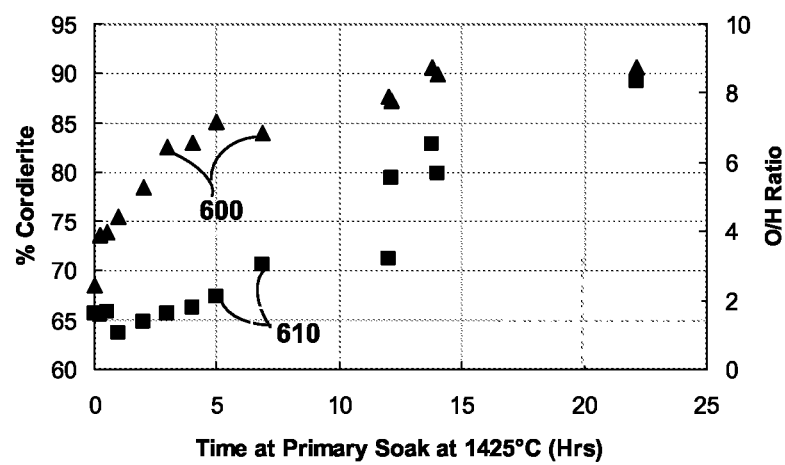
FIG. 6 shows O/H (squares; 610) and total cordierite (% cordierite; triangles; 600) as a function of single fire soak time at about 1425° C.
Figure 7:
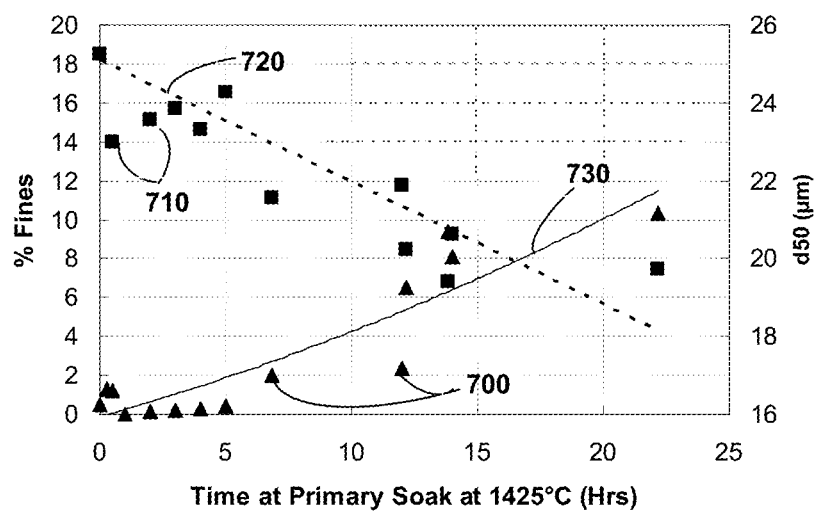
FIG. 7 shows pore d50 and % fines less than 10 microns vs. single soak time.

Tables 1 and 2 list, and FIGS. 6 and 7 illustrate the impact of soak time on properties for comparative single step firing.

FIG. 6 shows O/H ratios (squares) (610) and total cordierite (% cordierite; triangles) (600) as a function of single fire soak time at about 1425° C.

FIG. 7 shows pore d50 and % fines less than 10 microns vs. single soak time where % Fines (triangles) (700), pore d50 (squares) (710), linear d50 (720), and linear (% Fines) (730).

Figure 8:
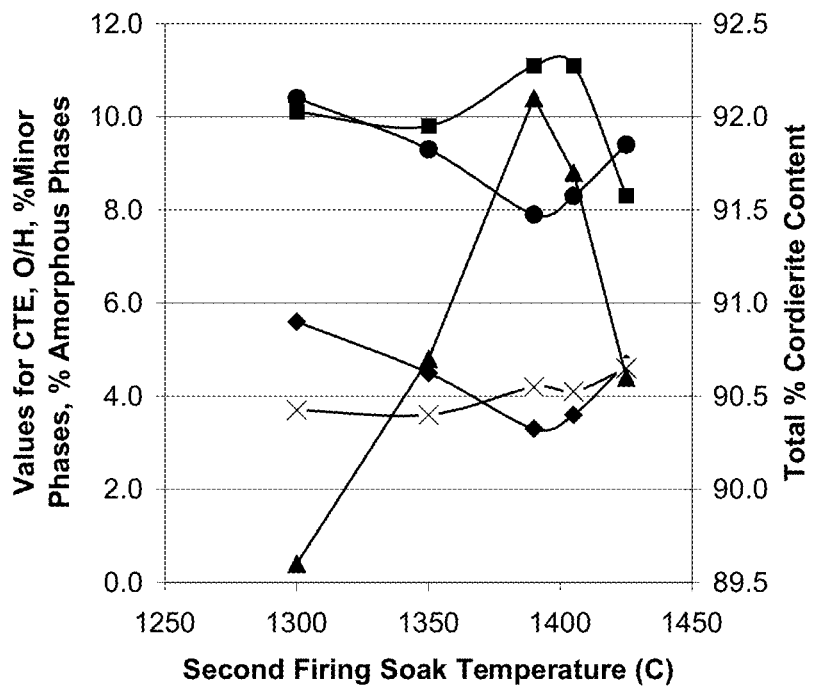
FIG. 8 shows plots of amorphous phase %, total minor phases, O/H ratio, and CTE for the inventive two step firing process as a function of the secondary soak temperature.

FIG. 8 shows plots of amorphous phase % (diamonds), total minor phases % (dots), O/H ratio (squares), Total Cordierite % (triangles), and CTE ("X") for the two step firing process as a function of secondary soak temperature.

Hold times of 8 hours or less at about 1425° C. would be expected to yield a body with a cordierite content less than or equal to 85% as illustrated in Sample 8 and by interpolated value Sample 7, see Tables 1 and 2. Sample 7 is expected to exhibit more than 10% amorphous phases which can be seen in the scanning electron micrographs of FIGS. 9 and 10.

Figure 9:
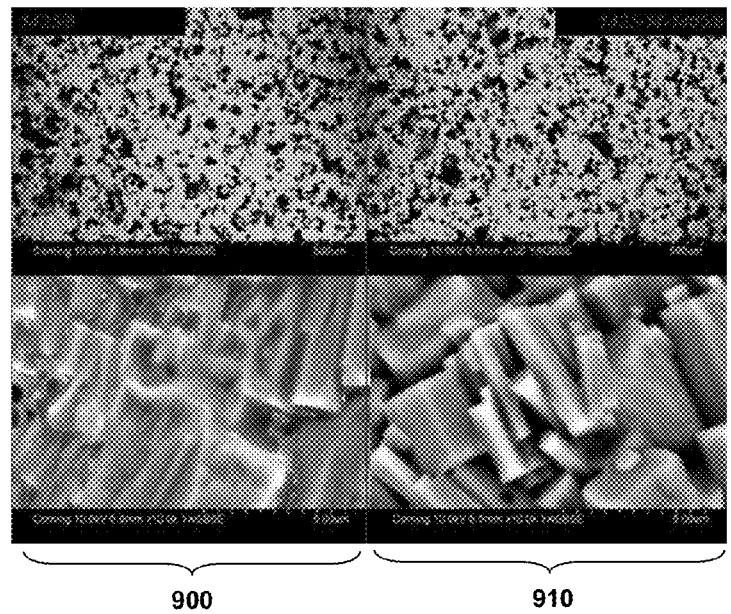
FIG. 9 shows scanning electron micrographs of comparative sample 8 (900, left) and inventive sample 10 (910, right).
Figure 10:
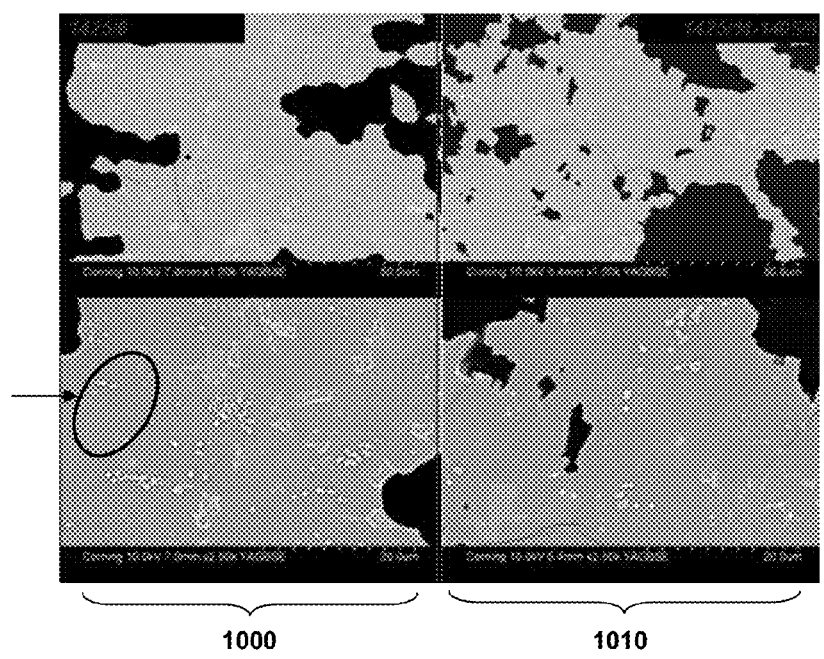
FIG. 10 shows scanning electron micrographs of cross-sectioned comparative sample 8 (1000, left) and inventive sample 10 (1010, right) showing glass phase in inter-granular regions of the under-fired sample 8.

FIG. 9 shows scanning electron micrographs of comparative Sample 8 (900, left) and inventive sample 10 (910, right). FIG. 9 shows the apparently amorphous material coating the surface of the as-fired Sample 7. FIG. 10 shows scanning electron micrographs of cross-sectioned comparative sample 8 (1000, left) and inventive sample 10 (1010, right) showing glass phase in inter-granular regions (arrow and oval) of the under-fired Sample 8. The amorphous phases in Sample 7 are also seen filling the inter-granular voids in the cross-section of FIG. 10. The O:H ratio of orthorhombic (O) to hexagonal (H) cordierite phases is seen to drop dramatically as the total cordierite content falls with lower soak times and it is seen that an O/H value of less than 4 is expected for an 8 hour single step firing.

Figure 11:
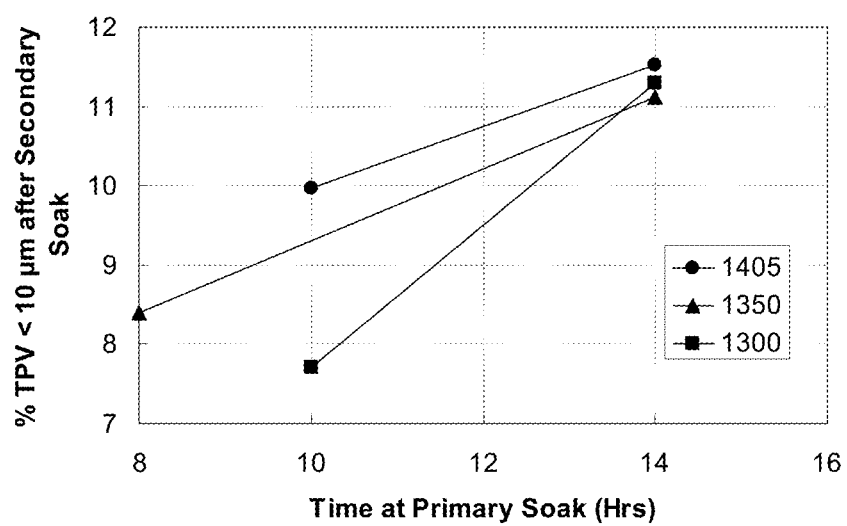
FIG. 11 shows % TPV less than 10 microns vs. primary soak time for secondary soak temperatures of 1405° C. and 1350° C.

FIG. 11 shows % TPV less than 10 microns vs. primary soak time for secondary soak temperatures of 1405° C. (dots), 1350° C. (triangles), and 1300° C. (squares). Primary or first soak temperatures were about 1425° C., whereas the actual measured part temperatures averaged from about 1422° to about 1426° C.

Comparative Example 2

A batch as in Comparative Example 1 was prepared and extruded in honeycomb form. For Sample 1, a firing schedule like that shown in FIG. 1 was used that has a high ramp rate of 66° C./hr from 1000° C. to soak, a soak temperature of 1423° C. and a cooling ramp of 66° C./hr. The high ramp rate (for this product/composition family) allows the formation of a high median pore size (d50) of about 19 microns, and fine pores size distribution (df) of about 0.43. Note that high d50 (and low d-factor) are a significant product attribute that gives the product an advantage in terms of pressure drop. However, high ramp rates may also produce high CTE which is not desirable for thermo-mechanical aspects of the product performance. A standard second firing (double firing) reduces the CTE (as compared to the value after the first complete firing process) and lowers % fines (i.e., TPV less than 10 microns). Present FIG. 1 corresonds to FIG. 5 of common owned and assigned patent U.S. Pat. No. 7,485,170, illustrating an exemplary prior art firing schedule that includes a first ramp portion (120) between room temperature and about 1300° C., a second ramp portion (130) between about 1300° C., and the soak portion (140). The ramp rates of the portions (120, 130) and the temperatures and times for the soak (140) are discussed further in U.S. Pat. No. 7,485,170. The article is then rapidly cooled down in cooling portion (150).

Example 3

Inventive Samples 9 through 13 listed in Table 3, illustrate the impact of a secondary soak at temperatures 20° C., 35° C., 75° C., and 125° C., lower than the primary hold temperature of 1425° C. A batch as in Comparative Example 1 was prepared and extruded in honeycomb form. FIG. 1 shows a preferred range of secondary soak temperatures that yield high total cordierite, high O/H, and low CTE. The secondary soak temperatures of between about 1350° C. and 1405° C. yield the best combination of low CTE and high cordierite content while secondary soaks of around 1300° C. or less do not yield cordierite contents at or above 90% and are not preferred. This example illustrates the independent process controls for adjusting porosity (d50 and TIV) and CTE. The ramp rate from 1000° C. to the soak temperature, and the primary soak time to substantially set the pore size distribution and the second step soak, develops CTE and microstructure stability as measured by O/H ratio.

Example 4

The ability to control % fines is illustrated by Inventive Samples 10, 12, 14, and 15 listed in Table 5. A batch as in Example 1 was prepared and extruded in honeycomb form. Samples 10 and 12 made use of 14 hour primary soaks followed by 8 hour secondary soaks at 1405° C. and 1350° C. respectively. Samples 14 and 15 illustrate the impact of shortening the primary hold to increase the amorphous content after the primary soak while using the same 8 hour secondary hold. The resulting fine porosity is dramatically lowered by this method yielding a reduction in % fines of 1.4% and 2.7%, respectively, for the 1405° C. (Sample 14) and 1350° C. holds (Sample 15) versus Samples 10 and 12 by shortening the primary hold from 14 hours to 10 and 8 hours. The drop in fines is achieved with less than one percent change in amorphous and total minor phases and $1 \times 10-7/°$ C. or less penalty in CTE.

Example 5

A batch was prepared as in Example 1 and extruded into honeycomb form. A quench experiment was performed where the kiln was programmed to a two-step soak method with primary soak of 1425° C. for 12 hours followed by a secondary soak of 1325° C. for 6 hours. Samples were periodically pulled from the kiln to track evolution of CTE, porosity, and phase(s) distribution. Pulled samples were quenched to room temperature and tested for CTE, porosity, and phase assemblage and had the properties listed in Table 6. Pull temperatures and time in soak are indicated for each sample.

Example 6

The ability to obtain high strength (MOR) and elastic modulus was demonstrated by Samples 18, 20, and 21 with different primary (first) soak conditions but a common secondary (second) soak temperature of 1300° C. Such a condition results in CTE less than $8 \times 10-7/°$ C., % fines less than 7%, MOR greater than 360 psi, and Emod greater than 0.6 Mpsi.

Example 7

The ability to obtain very low CTE was demonstrated by sample 19. This sample was obtained using high primary (greater than 1425° C.) and high secondary (greater than 1350° C.) temperatures. Soak times are adjusted for a high cordierite content and high O/H ratio.

Example 8

Samples 22, 23, and 24 illustrated the ability to further enhance CTE, MOR, Emod and % fines. Such conditions result in a CTE less than $5 \times 10-7/°$ C., MOR greater than 275 psi, Emod greater than 0.46, and % fines less than 8%. Also samples 23 and 24 ramp to soak temperature 1 was adjusted to lower d50 without significantly impacting other properties, which again demonstrates independent process controls for adjusting d50 and CTE.

Conditions for the disclosed inventive samples are listed in accompanying Tables 3 to 5.

The disclosure has been described with reference to various specific embodiments and techniques. However, it should be understood that many variations and modifications are possible while remaining within the scope of the disclosure.

TABLE 1

Phase Assemblage and CTE from Comparative Sample Conditions.

| Sample | Soak Temperature (° C.) | Soak Time (hr) | Total Cordierite (%) | Total Minor Phases (%) | Amorphous Phase (%) | O/H Ratio | CTE (×10$^{-7}$/° C.) |
|---|---|---|---|---|---|---|---|
| 1 | 1423 | 12 | 88.9 | 11.1 | 6.0 | 6.9 | 5.1 |
| 2 | 1417 | 15 | 88.6 | 11.4 | 6.4 | 6.6 | 6.0 |
| 3 | 1425 | 22 | 90.6 | 9.4 | 4.7 | 8.3 | 4.6 |
| 4 | 1426 | 14 | 90.2 | 9.8 | 5.0 | 6.1 | 5.5 |
| 5 | 1424 | 12 | 87.2 | 12.8 | 7.8 | 5.5 | 6.4 |
| 6 |  | 10* | 86.1 | 13.9 | 8.7 | 4.7 | 6.9 |
| 7 |  | 8* | 85.0 | 15.0 | 9.5 | 3.8 | 7.5 |
| 8 | 1426 | 6 | 83.9 | 16.1 | 10.4 | 3.0 | 8.0 |

*Interpolated values

TABLE 2

Thermo-Mechanical and Hydrodynamic Properties from Comparative Sample Conditions.

| Sample # | Soak Temperature (° C.) | Soak Time (hr) | EMOD (Mpsi) | MOR (psi) | % porosity | Pore d50 microns | % Fines less than 10 microns |
|---|---|---|---|---|---|---|---|
| 1 | 1423 | 12 | 0.5 | 278.0 | 52.3 | 19.3 | 10.4 |
| 2 | 1420* | 15 | 0.5 | 330 | 52.4 | 19.1 | 10.3 |
| 3 | 1425 | 22 | 0.4 | 252.0 | 52.0 | 20.1 | 9.9 |
| 4 | 1427 | 14 | 0.5 | 313.0 | 52.6 | 20.0 | 8.7 |
| 5 | 1427 | 12 | 0.5 | 308.0 | 51.5 | 20.2 | 6.6 |
| 8 | 1425 | 6 | 0.6 | 328.0 | 50.3 | 21.6 | 2.0 |

*Estimated

TABLE 3

Phase Assemblage and CTE for Inventive Conditions.

| Sample # | Primary Soak Temp. (° C.) | Average Piece Primary Soak Temp (° C.) | Primary Soak Time (hr) | Secondary Soak Temp (° C.) | Average Piece Secondary Soak Temp (° C.) | Secondary Soak Time (hr) | Total Cordierite (%) | Total Minor Phases (%) | Amorphous Phase (%) | O/H Ratio | CTE (×10$^{-7}$/° C.) |
|---|---|---|---|---|---|---|---|---|---|---|---|
| 9 | 1425 | 1423 | 14 | 1425 | 1423 | 8 | 90.6 | 9.4 | 4.7 | 8.3 | 4.6 |
| 10 | 1425 | 1424.5 | 14 | 1405 | 1402 | 8 | 91.6 | 8.4 | 3.7 | 11.4 | 3.8 |
| 11 | 1425 | 1424 | 14 | 1390 | 1386 | 8 | 92.1 | 7.9 | 3.3 | 11.1 | 4.2 |
| 12 | 1425 | 1423 | 14 | 1350 | 1346 | 8 | 90.7 | 9.3 | 4.5 | 9.8 | 3.6 |
| 13 | 1425 | 1423 | 14 | 1300 | 1295 | 8 | 89.6 | 10.4 | 5.6 | 10.1 | 3.7 |
| 14 | 1425 | 1423 | 10 | 1405 | 1400 | 8 | 91.5 | 8.5 | 3.5 | 9.1 | 5.1 |
| 15 | 1429 | 1427 | 8 | 1350 | 1344 | 8 | 89.8 | 10.2 | 5.2 | 8.7 | 4.2 |
| 16 | 1432 | 1430 | 8 | 1350 | 1346 | 8 | 89.7 | 10.3 | 5.6 | 8.0 | 3.9 |
| 17 | 1418 | 1416 | 14 | 1405 | 1400 | 4 | 90.0 | 10 | 4.9 | 8.9 | 6.4 |
| 18 | 1434 | 1430 | 4 | 1300 | 1294 | 10 | 86.3 | 13.7 | 8.6 | 5.4 | 6.8 |
| 19 | 1435 | 1427 | 10 | 1361 | 1350 | 10 | 90.8 | 9.3 | 4.4 | 10.4 | 1.8 |
| 20 | 1430 | 1429 | 8 | 1300 | 1298 | 8 | 89.7 | 10.3 | 5.4 | 5.9 | 5.8 |
| 21 | 1430 | 1427 | 10 | 1325 | 1321 | 4.5 | 89.0 | 11 | 6.1 | 6.6 | 6.6 |
| 22 | 1430 | 1429 | 10 | 1325 | 1323 | 6 | 91.7 | 8.29 | 3.58 | 7.00 | 4.7 |
| 23 | 1430 | 1427 | 10 | 1325 | 1321 | 6 | 89.8 | 10.21 | 5.41 | 7.19 | 4.4 |
| 24 | 1430 | 1428 | 11 | 1300 | 1296 | 5 | 89.3 | 10.70 | 5.52 | 6.80 | 4.5 |

TABLE 4

Thermo-Mechanical and Hydrodynamic Properties for Inventive Conditions.

| Sample # | Primary Soak Temperature (° C.) | Average Piece Primary Soak Temperature (° C.) | Primary Soak Time (hr) | Secondary Soak Temperature (° C.) | Average Piece Secondary Soak Temperature (° C.) | Secondary Soak Time (hr) | EMOD (Mpsi) | MOR (psi) | % porosity | Pore d50 (microns) | % Fines <10 microns |
|---|---|---|---|---|---|---|---|---|---|---|---|
| 9 | 1425 | 1423 | 14 | 1425 | 1423 | 8 | 0.43 | 252 | 52.0 | 19.7 | 10.3 |
| 10 | 1425 | 1424.5 | 14 | 1405 | 1402 | 8 | 0.42 | 236 | 51.9 | 19.4 | 11.5 |
| 11 | 1425 | 1424 | 14 | 1390 | 1386 | 8 | 0.39 | 222 | 53.0 | 21.2 | 9.3 |
| 12 | 1425 | 1423 | 14 | 1350 | 1346 | 8 | 0.38 | 221 | 53.3 | 19.8 | 11.1 |
| 13 | 1425 | 1423 | 14 | 1300 | 1295 | 8 | 0.40 | 217 | 52.3 | 19.5 | 11.3 |
| 14 | 1425 | 1423 | 10 | 1405 | 1400 | 8 | 0.40 | 251 | 52.7 | 20.9 | 10.0 |
| 15 | 1429 | 1427 | 8 | 1350 | 1344 | 8 | 0.46 | 258 | 50.3 | 18.8 | 8.4 |
| 16 | 1432 | 1430 | 8 | 1350 | 1346 | 8 | 0.45 | 270 | 51.0 | 20.1 | 7.3 |
| 17 | 1418 | 1416 | 14 | 1405 | 1400 | 4 | 0.50 | 281 | 52.4 | 19.7 | 11.3 |
| 18 | 1434 | 1430 | 4 | 1300 | 1294 | 10 | 0.61 | 364 | 49.4 | 20.2 | 6.2 |
| 19 | 1435 | 1427 | 10 | 1361 | 1350 | 10 | 0.41 | 228 | 51.5 | 19.3 | 8.4 |
| 20 | 1430 | 1429 | 8 | 1300 | 1298 | 8 | 0.61 | 378 | 50.5 | 20.6 | 5.4 |
| 21 | 1430 | 1427 | 10 | 1325 | 1321 | 4.5 | 0.63 | 403 | 50.6 | 19.2 | 8.1 |
| 22 | 1430 | 1429 | 10 | 1325 | 1323 | 6 | 0.46 | 293 | 50.6 | 21.0 | 6.2 |
| 23 | 1430 | 1427 | 10 | 1325 | 1321 | 6 | 0.49 | 280 | 50.6 | 20.1 | 7.6 |
| 24 | 1430 | 1428 | 11 | 1300 | 1296 | 5 | 0.48 | 290 | 50.9 | 20.4 | 7.4 |

TABLE 5

Comparison of Inventive (10, 12, 14, and 15) and Comparative (4, 6, and 7) Sample Properties.

| Inventive Sample # | Single Soak Comparative Sample # | Change in Total Cordierite (%) | Change in Amorphous Phase (%) | Change in Total Minor Phases (%) | Change in O/H Ratio | Change in CTE |
|---|---|---|---|---|---|---|
| 10 | 4 | 1.4 | −1.3 | −1.4 | 5.3 | −2.7 |
| 12 | 4 | 0.5 | −0.5 | −0.5 | 3.7 | −1.9 |
| 14 | 6 | 5.4 | −5.2 | −5.4 | 4.4 | −1.8 |
| 15 | 7 | 4.8 | −4.2 | −4.8 | 4.9 | −3.3 |

TABLE 6

Two-step soak quench results.

| Inventive Sample # | pull temp (° C.) | Hold time at temperature | MPD microns (d50) | Calc. % Porosity | % fines | CTE (×10$^{-7}$/° C.) | Total % Cordierite | Amorphous Phase (%) | Total % Minor Phases | O/H ratio |
|---|---|---|---|---|---|---|---|---|---|---|
| 25 | 1200 | 0 | 0.95 | 47.90 | 95.82 | 122.45 | — | — | — | — |
| 26 | 1300 | 0 | 4.98 | 46.36 | 82.07 | 63.85 | — | — | — | — |
| 27 | 1360 | 0 | 17.20 | 45.71 | 10.07 | 29.55 | 59.01 | 14.30 | 40.99 | 0.507 |
| 28 | 1400 | 0 | 17.25 | 46.91 | 5.49 | 24.6 | 61.53 | 17.92 | 38.47 | 0.824 |
| 29 | 1425 | 0 | 25.25 | 47.06 | 0.48 | 21.7 | 68.52 | 17.49 | 31.48 | 1.629 |
| 30 | 1425 | 0.25 | 26.97 | 47.42 | 1.26 | 17.2 | 73.65 | 14.76 | 26.35 | 1.561 |
| 31 | 1425 | 0.5 | 22.99 | 47.27 | 1.22 | 16.6 | 73.92 | 15.62 | 26.08 | 1.668 |
| 32 | 1425 | 1 | 27.40 | 47.22 | 0.00 | 16.4 | 75.39 | 14.96 | 24.61 | 1.034 |
| 33 | 1425 | 2 | 23.58 | 48.33 | 0.13 | 14.6 | 78.44 | 13.74 | 21.56 | 1.362 |
| 34 | 1425 | 3 | 23.86 | 48.30 | 0.19 | 13.65 | 82.52 | 10.53 | 17.48 | 1.624 |
| 35 | 1425 | 4 | 23.30 | 49.54 | 0.27 | 11.5 | 82.88 | 11.25 | 17.12 | 1.789 |
| 36 | 1425 | 5 | 24.28 | 48.63 | 0.46 | 10.9 | 85.10 | 9.41 | 14.90 | 2.115 |
| 37 | 1425 | 12 | 21.88 | 50.90 | 2.39 | 9.95 | 87.62 | 7.53 | 12.38 | 3.202 |
| 38 | 1325 | 0 | 21.22 | 50.76 | 5.03 | 8.2 | 89.67 | 5.47 | 10.33 | 6.110 |
| 39 | 1325 | 0.5 | 21.72 | 51.41 | 4.88 | 6 | 89.72 | 5.59 | 10.28 | 6.361 |
| 40 | 1325 | 1 | 22.14 | 49.72 | 5.16 | 5.9 | 89.22 | 6.08 | 10.78 | 6.415 |
| 41 | 1325 | 2 | 21.52 | 50.42 | 4.70 | 5.05 | 88.84 | 6.50 | 11.16 | 6.711 |
| 42 | 1325 | 3 | 21.36 | 50.51 | 5.41 | 4.7 | 90.23 | 5.17 | 9.77 | 7.111 |
| 43 | 1325 | 4.5 | 21.48 | 50.24 | 5.60 | 4.6 | 89.21 | 6.36 | 10.79 | 7.197 |
| 44 | 1325 | 6 | 21.15 | 51.66 | 7.30 | 3.8 | 89.55 | 5.93 | 10.45 | 7.979 |
| 45 | 1170 | 0 | 21.88 | 51.26 | 6.67 | 3.3 | 89.05 | 6.30 | 10.95 | 9.673 |
| 46 | 25 | 0 | 22.49 | 49.91 | 4.81 | 3.75 | 89.79 | 5.58 | 10.21 | 9.348 |

What is claimed is:

1. A method for making a cordierite filter article, comprising:
   firing an extruded green body batch composition according to:
   a first temperature ramping from ambient temperature up to a first soaking temperature;
   a first soaking at a temperature of at least 1255° C. for a first soaking time of at least 2 hours;
   a second temperature ramping from the first soaking temperature down to a second soaking temperature;
   a second soaking at a temperature of at least 1250° C. and at least 5° C. below the first soaking temperature for a second soaking time to produce a fired body; and
   a third temperature ramping to cool the fired body to ambient temperature, wherein the first soaking time and the second soaking time are each accomplished over about 2 to 12 hrs, and the fired body has an amorphous phase present in at least 3 wt %, and the fired body has a % fines or total pore volume of less than 10 microns present in an amount of at least 5 wt % after the second soaking when the third temperature ramping cools the body to ambient temperature.

2. The method of claim 1 wherein the first soaking temperature is from 1400 to 1435° C., and the second soaking temperature is from 1290 to 1410° C.

3. The method of claim 1 wherein the second soaking temperature is 10 ° C. below first soaking temperature of at least 1300 ° C.

4. The method of claim 1 wherein the first soaking is accomplished over about 2 to about 30 hours, and the second soaking is accomplished over about 2 to about 30 hours.

5. The method of claim 1 wherein the second temperature ramping from the first soaking temperature down to a second soaking temperature is accomplished at about 25° C./hr to about 150° C./hr.

6. The method of claim 1 wherein the third temperature ramping from the second soaking temperature to ambient temperature is accomplished at a rate of about 50° C./ hr to 250° C./ hr.

7. The method of claim 1 wherein the first temperature ramping is from about 25° C./hr to about 100° C./hr.

8. The method of claim 1 wherein the amorphous phase is present in an amount of from 3 to 25 wt % based on the total weight of the resulting fired body.

9. The method of claim 1 wherein the % fines are present in an amount of from 5% to 15% after the second soaking.

10. The method of claim 1 wherein a wt % glass in the extruded green body batch before the first soaking is from 10 to 50%, and at the completion of the first soaking time there is less than 95% complete conversion to cordierite.

11. The method of claim 1 wherein the resulting cordierite filter article has a CTE of from about 1 to about 8 ×10$^{-7}$ (° C$^{-1}$), an orthorhombic to hexagonal (O/H) cordierite phase ratio of from about 7 to about 12, and a % fines of from about 5 to about 15 wt %.

12. The method of claim 1 wherein the resulting cordierite filter article has a CTE of from about 3 to about 8×10$^{-7}$ (° C$^{-1}$ ), the wt % amorphous phase is from about 5 to about 10 wt %, the MOR is from 2.28 to 2.93 MPa (about 330 psi to about 425 psi) for a 200/12 product configuration, and the Emod is from 4,137 to 6,895 MPa (about 0.6 to about 1 Msi) for a 200/12 product configuration.

13. A method of making a ceramic honeycomb article, comprising:

forming a honeycomb green body from a plasticized cordierite precursor batch composition containing: inorganic batch components selected from a magnesium oxide source; an alumina-forming source; a silica-forming source, or a combination thereof; a pore former; a liquid vehicle; and a binder; and accomplishing a firing according to claim 1 of the honeycomb green body effective to convert the honeycomb green body into a ceramic honeycomb article containing cordierite, wherein the silica-forming source has a silica particle size distribution $d_{50}$ of about 20 microns and the first soaking time is from about 5 to 10 hours.

14. The method of claim 13 wherein the median particle size of one or more of the inorganic batch components is from about 10 to about 50 microns, and the pore former has a median particle diameter greater than 40 microns.

15. The method of claim 13 wherein the resulting ceramic honeycomb article containing cordierite has a CTE of from about 1 to about $8 \times 10^{-1}$ (° $C^{-1}$), an orthorhombic to hexagonal (O/H) cordierite phase ratio of from about 7 to about 12, and the % fines is from about 5 to about 15%.

16. The method of claim 13 wherein the first soaking is from 2 to 6 hours at a temperature of greater than 1427° C., the second soaking is from 2 to 6 hours at a temperature of less than 1350° C.

17. The method of claim 13 wherein the resulting ceramic honeycomb article containing cordierite has a die cell density of 200 cpsi, a wall thickness from 6 to 10 mils, and a MOR of greater than 1.31 MPa (190 psi), or a die cell density of 300 cpsi, a wall thickness from 6 to 10 mils, and a MOR of greater than 1.59 MPa (230 psi).

\* \* \* \* \*